(12) United States Patent
Magenheimer et al.

(10) Patent No.: US 8,296,760 B2
(45) Date of Patent: Oct. 23, 2012

(54) MIGRATING A VIRTUAL MACHINE FROM A FIRST PHYSICAL MACHINE IN RESPONSE TO RECEIVING A COMMAND TO LOWER A POWER MODE OF THE FIRST PHYSICAL MACHINE

(75) Inventors: Daniel J. Magenheimer, Ft. Collins, CO (US); Bret A. McKee, Ft. Collins, CO (US); Robert D. Gardner, Ft. Collins, CO (US); Chris D. Hyser, Victor, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1762 days.

(21) Appl. No.: 11/588,518

(22) Filed: Oct. 27, 2006

(65) Prior Publication Data
US 2008/0104587 A1    May 1, 2008

(51) Int. Cl.
*G06F 9/455* (2006.01)
(52) U.S. Cl. .......................................................... 718/1
(58) Field of Classification Search .................. None
See application file for complete search history.

(56) References Cited

U.S. PATENT DOCUMENTS

| | | | |
|---|---|---|---|
| 5,745,735 A | 4/1998 | Cohn | |
| 5,802,062 A | 9/1998 | Gehani | |
| 6,321,337 B1 | 11/2001 | Reshef | |
| 6,360,256 B1 * | 3/2002 | Lim | 709/223 |
| 6,421,739 B1 | 7/2002 | Holiday | |
| 6,732,139 B1 | 5/2004 | Dillenberger | |
| 6,901,522 B2 | 5/2005 | Buch | |
| 6,934,952 B2 | 8/2005 | Sarkar | |
| 6,944,699 B1 | 9/2005 | Bugnion et al. | |
| 6,970,902 B1 | 11/2005 | Moon | |
| 6,985,951 B2 | 1/2006 | Kubala | |
| 7,089,558 B2 | 8/2006 | Baskey | |
| 7,127,625 B2 | 10/2006 | Farkas | |
| 7,174,381 B2 | 2/2007 | Gulko | |
| 7,203,944 B1 | 4/2007 | van Rietschote | |
| 7,466,449 B2 * | 12/2008 | Jacobs | 358/1.9 |
| 7,480,908 B1 | 1/2009 | Tene | |
| 7,519,964 B1 | 4/2009 | Islam | |
| 7,577,959 B2 | 8/2009 | Nguyen | |
| 7,590,873 B2 * | 9/2009 | Takahashi et al. | 713/300 |
| 2001/0034752 A1 | 10/2001 | Kremien | |
| 2002/0087611 A1 | 7/2002 | Tanaka | |
| 2002/0194389 A1 | 12/2002 | Worley, Jr. et al. | |
| 2003/0037092 A1 | 2/2003 | McCarthy | |

(Continued)

OTHER PUBLICATIONS

MVware Technology Network, "VMware VirtualCenter 1.2 Support Documentation," http://www.vmware.com/support/vc12/doc/c13migrationover.html, 16 pages (at least as early as Oct. 25, 2006).

(Continued)

*Primary Examiner* — Meng An
*Assistant Examiner* — Eric C Wai

(57) ABSTRACT

A command is received to place a first physical machine into a lower power mode. The first physical machine has a virtual machine. In response to the received command, a procedure is performed to migrate the virtual machine from the first physical machine to a second physical machine.

12 Claims, 4 Drawing Sheets

U.S. PATENT DOCUMENTS

| | | |
|---|---|---|
| 2004/0010787 A1 | 1/2004 | Traut |
| 2004/0117539 A1 | 6/2004 | Bennett |
| 2004/0128670 A1 | 7/2004 | Robinson |
| 2004/0186920 A1 | 9/2004 | Birdwell |
| 2004/0193476 A1 | 9/2004 | Aerdts |
| 2005/0039180 A1 | 2/2005 | Fultheim |
| 2005/0060590 A1 | 3/2005 | Bradley |
| 2005/0149940 A1 | 7/2005 | Calinescu |
| 2005/0166074 A1 | 7/2005 | Hack |
| 2005/0166075 A1 | 7/2005 | Hack |
| 2005/0246505 A1 | 11/2005 | McKenney et al. |
| 2005/0251802 A1* | 11/2005 | Bozek et al. ................ 718/1 |
| 2005/0278722 A1 | 12/2005 | Armstrong et al. |
| 2006/0023884 A1 | 2/2006 | McKee |
| 2006/0041733 A1 | 2/2006 | Hyser |
| 2006/0075067 A1 | 4/2006 | Blackmore |
| 2006/0136913 A1 | 6/2006 | Sameske |
| 2006/0149906 A1 | 7/2006 | Misra |
| 2006/0195715 A1 | 8/2006 | Herington |
| 2006/0200819 A1 | 9/2006 | Cherkasova et al. |
| 2006/0200820 A1 | 9/2006 | Cherkasova et al. |
| 2006/0200821 A1 | 9/2006 | Cherkasova et al. |
| 2006/0230407 A1 | 10/2006 | Rosu |
| 2007/0043860 A1 | 2/2007 | Pabari |
| 2007/0067435 A1 | 3/2007 | Landis |
| 2007/0079307 A1 | 4/2007 | Dhawan |
| 2007/0083642 A1 | 4/2007 | Diedrich |
| 2007/0124474 A1 | 5/2007 | Margulis |
| 2007/0171921 A1 | 7/2007 | Wookey |
| 2007/0180280 A1 | 8/2007 | Bolan |
| 2007/0180448 A1 | 8/2007 | Low |
| 2007/0180450 A1 | 8/2007 | Croft |
| 2007/0186212 A1 | 8/2007 | Mazzaferri |
| 2008/0104608 A1 | 5/2008 | Hyser |

OTHER PUBLICATIONS

Wikipedia definition of "Virtual machine," http://en.wikipedia.org/wiki/Virtual_machine, pp. 1-6 (at least as early as Sep. 6, 2006).

TheFreeDictionary definition of "Virtual Machine," http://computing-dictionary.thefreedictionary.com/virtual%20machine, pp. 1-3 (at least as early as Sep. 6, 2006).

Wikipedia definition for "Hypervisor," http://en.wikipedia.org/wiki/Hypervisor, pp. 1-2 (at least as early as Sep. 6, 2006).

Megow et al., "Stochastic Online Scheduling on Parallel Machines," Springer-Verlag Berlin Heidelberg, pp. 167-180, 2005.

Hou et al., "A Genetic Algorithm for Multiprocessor Scheduling," IEEE Transactions on Parallel and Distributed Systems, vol. 5, No. 2, Feb. 1994.

YarKhan et al., "Experiments with Scheduling Using Simulated Annealing in a Grid Environment," Springer-Verlag Berlin Heidelberg, pp. 232-242, Jun. 2002.

Hyser et al, U.S. Appl. No. 12/240,694 entitled "Migrating a Virtual Machine Based on Information Relating to Communications Among Virtual Machines" filed Sep. 29, 2008 (23 pages).

Hyser et al., U.S. Appl. No. 12/240,611 entitled "Migration of a Virtual Machine in Response to Regional Environment Effects" filed Sep. 29, 2008 (28 pages).

Hyser et al., U.S. Appl. No. 11/588,607 entitled "Migrating Virtual Machines Between Physical Machines in a Defined Group" filed Oct. 27, 2006 (28 pages).

Hyser et al., U.S. Appl. No. 11/588,683 entitled "Retrieving Data of a Virtual Machine Based on Demand to Migrate the Virtual Machine Between Physical Machines" filed Oct. 27, 2006 (26 pages).

Hyser et al.., U.S. Appl. No. 11/588,691 entitled "Selecting One of Plural Layouts of Virtual Machines on Physical Machines" filed Oct. 27, 2006 (29 pages).

* cited by examiner

MIGRATING A VIRTUAL MACHINE FROM A FIRST PHYSICAL MACHINE IN RESPONSE TO RECEIVING A COMMAND TO LOWER A POWER MODE OF THE FIRST PHYSICAL MACHINE

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed.

In addition, a greater level of isolation is provided between or among applications running in different virtual machines. In some cases, virtual machines also allow multiple applications to more efficiently share common resources (processing resources, input/output or I/O resources, and storage resources) of the computer Normally, when a physical machine is powered down (either shut off or placed into a lower power mode), any virtual machine running in such a physical machine is also shut off or otherwise disabled or made unavailable. The particular physical machine that was shut off or otherwise placed into lower power mode can be part of a network of physical machines. Disabling of virtual machines on the particular physical machine may be an unexpected event that may disrupt or adversely affect operation of other physical machines or the overall system.

SUMMARY

In accordance with some embodiments, in a system having plural physical machines containing virtual machines, a mechanism or technique is provided to migrate virtual machine(s) from a first physical machine to one or more other physical machines in response to the first physical machine being placed into a lower power mode.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

In accordance with some embodiments, a system includes plural physical machines containing virtual machines, with the system further including a mechanism to migrate virtual machine(s) from a first physical machine to one or more other physical machines in response to the first physical machine being placed into a lower power mode. A "lower power mode" refers to either shutting down the first physical machine or otherwise placing the first physical machine into a power saving mode, such as sleep mode, standby mode, hibernation mode, and so forth. The mechanism to migrate virtual machine(s) between or among physical machines in response to placing a physical machine into a lower power mode can be provided by modules within the physical machines or by a central controller (or controllers) separate from the physical machines.

Figure 1:
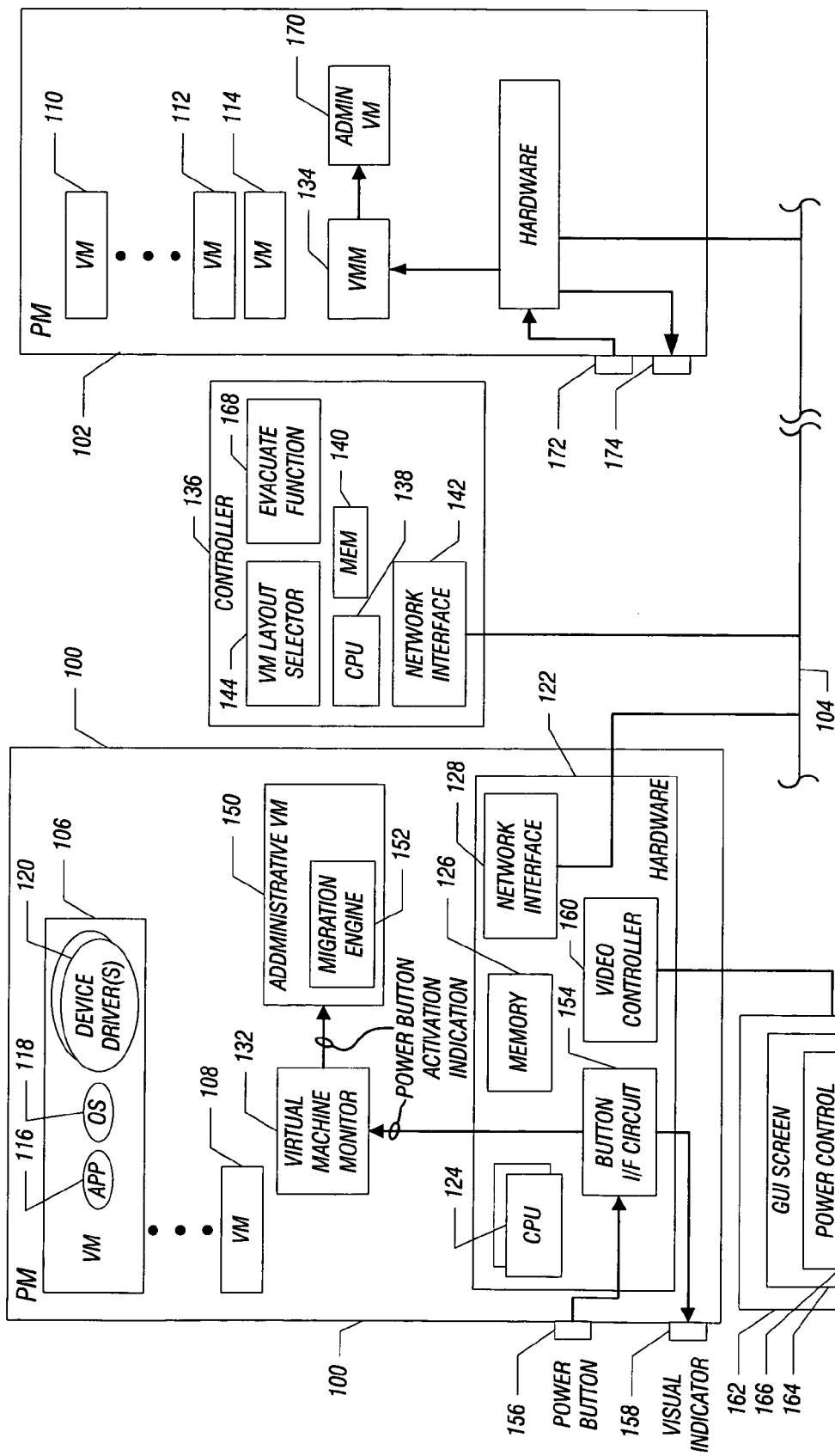
FIG. 1 is a block diagram of a system of physical machines on which virtual machines are deployed, where the system is responsive to placement of any physical machine into a lower power mode by migrating virtual machine(s) on such physical machine to other physical machine(s) in accordance with some embodiments.

FIG. 1 illustrates a system that includes multiple physical machines 100, 102 that are interconnected by a network 104. Examples of the network 104 include a local area network (LAN), a wide area network (WAN), the Internet, or any other type of communications link. The physical machines can be located within one cabinet (or rack), or alternatively, the physical machines can be located in multiple cabinets (or racks). The network 104 can also include system buses or other fast interconnects. Although reference is made to "network" in the discussion, it is noted that some embodiments can be used with other types of interconnects. The system depicted in FIG. 1 can be any one of a data center, an application server farm, a storage server farm (or storage area network), a web server farm, a switch or router farm, and so forth. Although just two physical machines are depicted in FIG. 1, it is noted that more than two physical machines can be utilized in other implementations. Examples of the physical machines include computers (e.g., application servers, storage servers, web servers, etc.), communications modules (e.g., switches, routers, etc.), and other types of machines. "Physical machine" indicates that the machine is an actual machine made up of software and hardware. Although each of the physical machines is depicted as being contained within a box, it is noted that a physical machine can be a distributed machine having multiple nodes that provide a distributed and parallel processing system.

Within each of the physical machines are various virtual machines (VMs). In the example of FIG. 1, two virtual machines 106, 108 are depicted in the physical machine 100, and three virtual machines 110, 112, 114 are depicted in the physical machine 102. Note that the numbers of virtual machines in each physical machine shown in FIG. 1 are provided for purposes of example, as different implementations can employ different numbers (one or more) of virtual machines in the corresponding physical machines.

A virtual machine refers to some partition or segment (made up of software and/or hardware) of the physical machine that is provided to virtualize or emulate a physical machine. From the perspective of a user, a virtual machine looks just like a physical machine. As depicted in FIG. 1, according to some embodiments, the virtual machine 106 includes one or more software applications 116, an operating system 118, and one or more device drivers 120 (which are typically part of the operating system 118). The other virtual machines 108, 110, 112, 114 can also contain software applications, operating systems, and device drivers.

It is noted that the operating systems that are part of corresponding virtual machines within a physical machine can be different types of operating systems or different versions of an operating system. This allows software applications designed for different operating systems to execute on the same physical machine.

The virtual machines within a physical machine are designed to share the physical resources of the physical machine. In the physical machine 100, these physical resources include the hardware 122, which hardware 122 includes one or more central processing units (CPUs) 124, memory (volatile memory and/or persistent storage, such as disk-based storage) 126, a network interface 128, and other resources (such as a storage area network interface, not shown).

The hardware 122 also includes a button interface circuit 154 that is connected to a power button 156. In some embodiments, the power button 156 can be a soft power button that causes the physical machine 100 to be placed into a lower power mode, such as sleep mode, standby mode, hibernation mode, and so forth. In other implementations, the lower power mode can also include a power off mode. The button interface circuit 154 is also connected to a visual indicator 158, which provides a visual indication (e.g., blinking lights, colored lights, etc.) that the power button 156 has been activated, and the physical machine 100 is processing activation of the power button 156. The visual indicator 158 is provided to allow a user to see that the physical machine 100 is responding to activation of the power button 156. As discussed above, activation of the power button 156 causes migration of virtual machine(s) from the physical machine 100, which can take some amount of time. The visual indicator 158 thus prevents the user from repeatedly pressing the power button 156 when the physical machine 100 is not immediately shut off.

Activation of the power button 156 causes the button interface circuit 154 to send a power button activation indication (command) 155 to a virtual machine monitor 132. In response to the power button activation indication 155, the virtual machine monitor 132 sends a power button activation indication (command) 157 to an administrative virtual machine 150. Note that the form of the power button activation indication 157 can be different from that of the power button activation indication 155. In one example, the power button activation command 155 can be an interrupt that indicates activation of the power button 156. On the other hand, the power button activation command 157 from the virtual machine monitor 132 to the administrative virtual machine 150 can be a software command, a software interrupt, or some other type of indication.

The administrative virtual machine 150 performs administrative tasks with respect to the physical machine 100. In another alternative, the administrative virtual machine 150 can also be omitted. The administrative virtual machine 150 includes a migration engine 152 that controls migration of virtual machines between the physical machine 100 and one or more other physical machines. Alternatively, the migration engine 152 can be provided separately from the administrative virtual machine 150. In yet another implementation, the migration engine 152 can be omitted, with an external controller 136 used instead to perform migration control.

In response to the power button activation indication 157, the migration engine 152 causes the virtual machines 106, 108 of the physical machine 100 to be migrated from the physical machine 100 to one or more other physical machines. This migration of virtual machines can be accomplished in one of several ways. In a first technique, the migration engine 152 can send a request (or requests) to one or more other physical machines on the network 104 to determine which of the physical machines on the network 104 can accommodate the virtual machines 106, 108. In response to responses from such physical machines, the migration engine 152 performs migration of the virtual machines 106, 108 to the physical machine(s) that is (are) able to accommodate the virtual machines. In a second technique, the migration engine 152, in response to the power button activation indication 157, can communicate with a placement controller 136 (separate from the physical machine 100) to identify which physical machine(s) the virtual machines 106, 108 can be migrated to.

In a third technique in which the migration engine 152 is omitted from the physical machine 100, the administrative virtual machine 150 responds to the power button activation indication 157 by contacting the placement controller 136 to allow the placement controller 136 to select placement of the virtual machines 106, 108 in the physical machine 100.

The hardware 122 also optionally includes a video controller 160 that is coupled to a display device 162, which display device 162 can be directly attached to the physical machine 100 (as depicted in FIG. 1). Alternatively, the display device 162 can be the display device of a remote machine that can be used to remotely control the physical machine 100. The display device 162 has a graphical user interface (GUI) screen 164 in which a power control element 166 is displayed for the purpose of controlling the power mode of the physical machine 100. A user can activate the power control element 166 (using an input device such as a mouse or other pointer device, or the keyboard). Alternatively, a power command can be issued from a command line prompt. Activation of the input device to select the power control element 166 of the display device 162 is translated by the virtual machine monitor 132 to be a power activation event, which can be communicated to the administrative virtual machine 150 as the power button activation indication 157. If the display device 162 is located at a remote machine, then a command can be sent over the network 104 to the virtual machine monitor 132 through the network interface 128 to place the physical machine 100 into a lower power mode, which command is forwarded as a power button activation indication 157 to the administrative virtual machine 150.

The physical machine 100 also includes a virtual machine monitor (VMM) 132, also called a hypervisor, which manages the sharing (by virtual machines 106, 108, 110) of the physical resources, including the hardware 122, of the physical machine 100. The VMM 132 virtualizes the physical resources, including the hardware 122, of the physical machine 100. Also, the VMM 132 intercepts request for resources from operating systems in the respective virtual machines 106, 108, 110 so that proper allocation of the physical resources of the physical machine 100 can be performed. For example, the VMM 132 manages memory access, input/output (I/O) device access, and CPU scheduling for the virtual machines. Effectively, the VMM 132 provides an interface between the operating system of each virtual machine and the underlying hardware 122 of the physical machine 100. The interface provided by the VMM 132 to an operating system of a virtual machine is designed to emulate the interface provided by the actual hardware of the physical machine 100.

The physical machine 102 similarly includes a virtual machine monitor 134 and an administrative virtual machine 170 that can include a migration engine (not shown). The hardware 130 of the physical machine 102 contains the same components as the hardware 122 in the physical machine 100. The hardware 130 is also connected to a power button 172 and a visual indicator 174 (similar to the power button 156 and visual indicator 158, respectively, of the physical machine 100).

As further shown in FIG. 1, the placement controller 136 (or multiple placement controllers) is (are) provided on the network 104 to provide automated management of placement of virtual machines in corresponding physical machines. In the ensuing discussion, reference is made to just one placement controller 136; however, note that the tasks of the one placement controller 136 can be performed by multiple placement controllers.

The placement controller 136 has a VM layout selector 144 to perform selection of a layout of the virtual machines mapped to physical machines. The placement controller 136 can also include an evacuate function 168. In some embodiments, the power button (156, 172) of each physical machine can be mapped to a corresponding evacuate function 168 in the placement controller 136. Activation of the power button invokes a call by the virtual machine monitor (132, 134) or administrative virtual machine (150, 170) of the corresponding evacuate function 168 in the placement controller 136. Note that there can be multiple evacuate functions 168 mapped to corresponding power buttons of respective physical machines. Alternatively, one evacuate function 168 is mapped to the power buttons of all physical machines in the system.

The calling of the evacuate function 168 in response to activation of the power button 156 causes the evacuate function 168 to cooperate with the VM layout selector 144 to control which physical machines the virtual machines of the physical machine that is being placed into lower power mode should be migrated to. Although not depicted in FIG. 1, the placement controller 136 can include migration control logic to control migration of virtual machines. If the migration control logic is present in the placement controller, then migration engines can be omitted in the physical machines.

In other embodiments, the VM layout selector 144 cooperates with a respective migration engine in the physical machine that is being placed into a lower power mode to select physical machines to which migration of virtual machines is to be performed. In yet another alternative, as discussed above, the placement controller 136 can be omitted altogether, with the migration engines of the physical machines controlling migration between physical machines in response to placing a physical machine into a lower power mode.

The placement controller 136 includes one or more CPUs 138 and memory 140. Also, a network interface 142 is provided in the placement controller 136 to allow communication between the placement controller 136 and the network 104.

Figure 2:
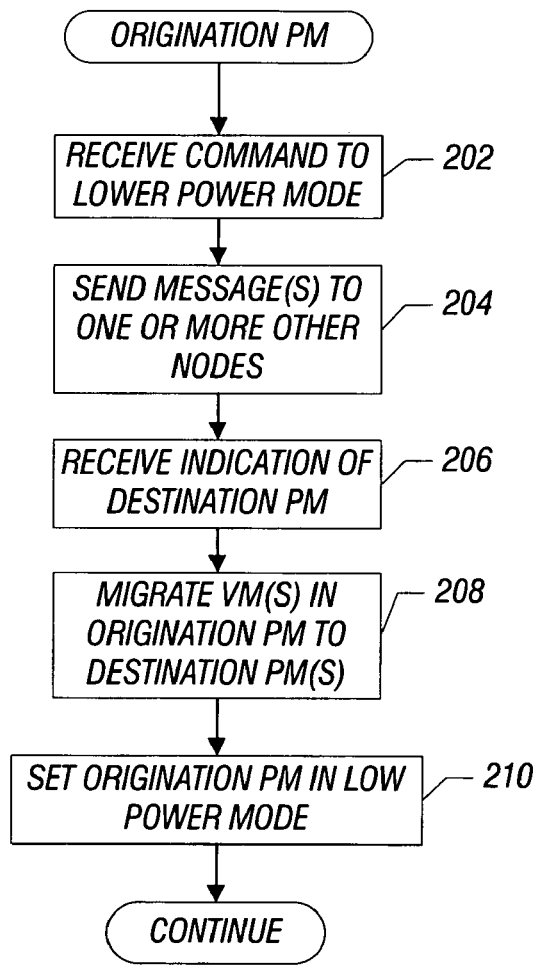
FIG. 2 is a flow diagram of a process of migrating virtual machine(s) between or among physical machines in response to placing a physical machine into a lower power mode, according to an embodiment.

FIG. 2 shows a flow diagram of a process according to an embodiment. A command is received (at 202) at an origination physical machine to place the origination physical machine into a lower power mode. The command can be due to activation of a power button (156, 172) or activation of a power control element 166 in a GUI screen 164. The received command can also be from a remote machine sent over the network 104.

In response to the command to lower the power of the origination physical machine, the migration engine of the origination physical machine sends (at 204) one or more messages (requests) to one or more other nodes, which can be other physical machines or the placement controller 136. The one or more messages are sent to the one or more other nodes to determine which destination physical machine(s) the virtual machine(s) of the origination physical machine should be migrated to. If the one or more messages are sent (at 204), such as by broadcast, to other physical machines, then the migration engine of each of the other physical machines makes a determination of whether the physical machine has sufficient resource (CPU, I/O, memory) availability to accommodate the virtual machine(s). If migration of a virtual machine from the origination physical machine would cause an overload condition of any resource or of the overall physical machine, then that physical machine would send an indication that it is unable to accommodate any virtual machine. Other factors considered include cooling considerations, power consumption considerations, and quality-of-service (QoS) considerations.

Alternatively, if the one or more messages are sent (at 204) to the placement controller 136, then the placement controller 136 determines some optimal placement of the virtual machine(s) of the origination physical machine (discussed further below).

One or more indications responsive to the one or more messages sent at 204 are received (at 206) by the origination physical machine, where the received indication(s) contain(s) identification of destination physical machine(s) that is (are) able to accommodate the virtual machine(s) of the origination physical machine.

The virtual machine(s) of the origination physical machine is (are) migrated (at 208) to the identified destination physical machine(s). The migration can be controlled by migration engines of the physical machines involved in the migration of the virtual machine(s), or the migration can be controlled by the placement controller 136. Migrating a virtual machine refers to moving the state of the virtual machine from one physical machine to another physical machine. The state of the virtual machine includes content of registers of various hardware devices (e.g., CPUs, I/O devices, and so forth). Data in memory associated with the migrated virtual machine can also be transferred gradually to the destination physical machine to which the virtual machine is migrated.

After the virtual machine(s) has (have) been successfully migrated from the origination physical machine, the origination physical machine can set in the lower power mode (at 210).

In some embodiments, a mechanism can be provided to allow a user to cancel the power down and migration procedure of FIG. 2. For example, if a user activates the power button or power control element a second time prior to occurrence of virtual machine migration, then the power down and migration procedure is canceled.

Note that in the implementation where the request(s) (204) are sent to other physical machines (which can be some predetermined group of physical machines) to determine which physical machine(s) the virtual machine(s) of the origination physical machine are to be migrated, the placement controller 136 may later (after the migration performed at 208) perform selection of a better placement of virtual machines on physical machines in the entire system. The selected placement may cause further migration of the virtual machine(s) migrated at 208.

It may be desirable to send request(s) to the predetermined group of physical machines, rather than the placement controller 136, because of quicker response times from the group of physical machines. As discussed further below, the placement controller 136 employs some placement algorithm to select an optimal placement. Although selection of the optimal placement may provide better overall performance of the entire system, such selection may take some amount of time that can cause a noticeable delay in the power-down procedure of the origination physical machine.

However, if the placement controller 136 is able to select a placement of virtual machines in a sufficiently small amount of time such that excessive delay is not experienced at the origination physical machine that is being powered down, then the origination physical machine can send the request(s) (204) directly to the placement controller 136 to achieve a better (or optimal) placement of virtual machines in response to a command to place the origination physical machine into a lower power mode. An "optimal" placement of virtual machines on physical machines refers to either a local or global optimal placement and to either an exact or approximate optimal placement. As another alternative, the placement controller 136 can be configured to have an emergency mode (invoked based on request) in which the placement controller 136 can produce an answer (a layout) in a relatively short amount of time. Thus, three options are available as discussed above: (1) do not use the placement controller; (2) use the placement controller in normal mode; or (3) use the placement controller in emergency mode.

Figure 3:
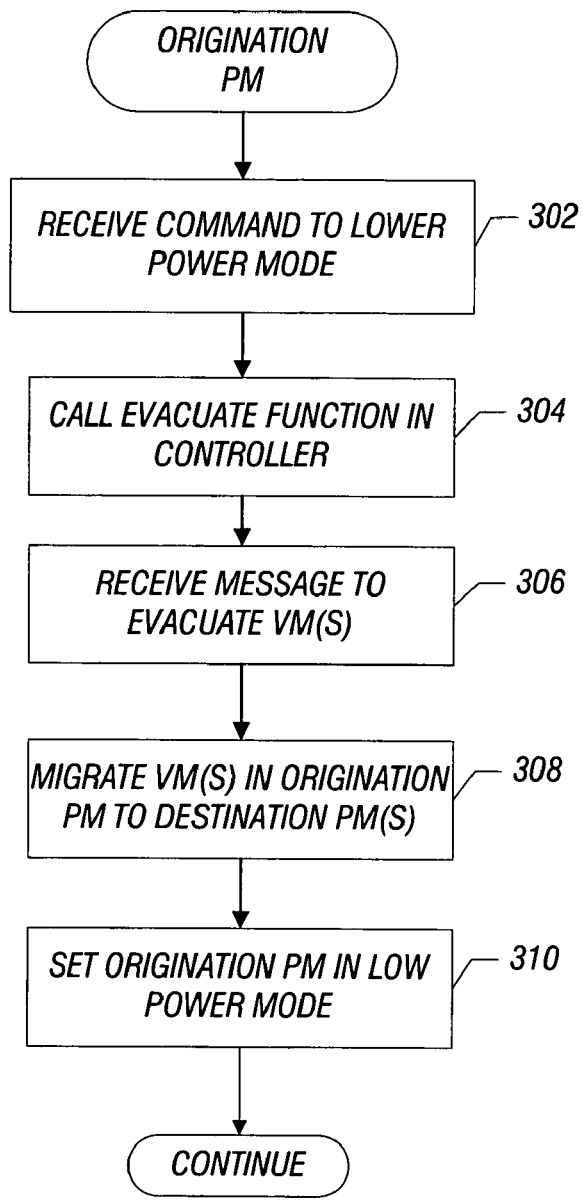
FIG. 3 is a flow diagram of a process of migrating virtual machine(s) between or among physical machines in response to placing a physical machine into a lower power mode, according to another embodiment.

FIG. 3 shows a different technique of migrating virtual machine(s) from an origination physical machine due to placement of the origination physical machine into a lower power mode. As depicted in FIG. 3, the origination physical machine receives (at 302) a command to place the origination physical machine into a lower power mode. The origination physical machine then calls (at 304) the evacuate function 168 (FIG. 1) of the placement controller 136. As noted above, this evacuate function 168 is mapped to the power button or other power control element of the origination physical machine. Note that calling the evacuate function 168 of the placement controller 136 differs from the technique of FIG. 2 in which the migration engine of the origination machine sends a message to the placement controller 136.

In response to the call, the evacuate function 168 cooperates with the VM layout selector 144 in the placement controller 136 to identify an optimal placement of virtual machines, including the virtual machine(s) of the origination physical machine. The origination physical machine then receives (at 306) a message to evacuate the virtual machine(s) on the origination physical machine. In response to the message, the origination physical machine 100 migrates (at 308) the virtual machine(s) to one or more destination physical machine(s) identified by the received message. Next, the origination physical machine is set into a lower power mode (at 310).

The following discusses the placement controller 136 in greater detail. In determining placement of virtual machines onto corresponding physical machines, the placement controller 136 (more specifically the VM layout selector 144) takes into account various predefined criteria. One type of predefined criteria is related to loading of physical resources (including hardware 122) or machines. Since there are various different physical resources (e.g., CPU, memory, network interface, storage network, etc.), there are different loading criteria to consider. The different loading criteria thus include a loading criterion relating to the CPU usage, a loading criterion relating to memory usage, a loading criterion relating to network interface usage, a loading criterion relating to storage network usage, and any other loading criteria relating to usage of other resources. Each of the resources is associated with a respective dimension. If there are n resources to be considered for the problem of optimal placement of virtual machines on physical machines, then these n resources correspond to n dimensions.

The loading criteria in n dimensions are factored into the decision regarding optimal placement of virtual machines. Also, another loading criterion is an overloading criterion, which specifies that any particular physical machine should not be loaded by greater than some predefined threshold (e.g., 80%). If loading of a physical machine exceeds this predefined threshold, then migration of virtual machine(s) from the overloaded physical machine would be desirable.

Placement of virtual machines should satisfy a QoS (quality of service) goal of the system. This QoS may have been set by a user or by the system. One example QoS goal is the allocation of scheduling shares to each virtual machine within a physical machine. The VMM 132 according to some implementations includes a scheduler that schedules access to physical resources of the physical machine 100, where the scheduler in the VMM 132 specifies the number of shares to allocate to each virtual machine. For example, 2,000 shares may be allocated to virtual machine 106, 1,000 shares may be allocated to virtual machine 108, and 500 shares may be allocated to virtual machine 110. In this example scenario, virtual machine 106 has half the number of shares of the physical machine 100. The half share of the physical resources of the physical machine can be considered a QoS goal of the virtual machine 106. Thus, if the placement controller 136 decides to migrate virtual machine 106 from physical machine 100 to another physical machine, such as physical machine 102, the placement controller 136 checks to ensure that after migration the QoS for virtual machine 106 can be kept at the same ratio.

The above is provided as an example of a QoS goal. Other examples can include a separate QoS for each of the n dimensions corresponding to the n resources.

Other example criteria that are considered by the VM layout selector 144 include cooling and power criteria. During operation, temperatures in physical machines can exceed a temperature threshold. If this occurs, then migration of virtual machines from the over-heated physical machines may be desirable. Cooling criteria can also specify cooling costs. In large data centers, for example, sophisticated cooling equipment is usually provided to cool physical machines. To reduce cooling costs, migration of virtual machines can be performed in a manner that allows some part of the cooling equipment to be turned off (or run in a lower power mode). In one example, virtual machines can be placed such that one or more physical machines can be turned off (or placed in a lower power state), such that corresponding cooling equipment can be shut off (or run in a lower power mode). The lower power state of a physical machine refers to any one of several possible power savings states of such machines, including sleep states, standby states, hibernation states, and so forth.

Power criteria are also considered by the VM layout selector 144. In addition to turning off (or placing into a lower power state) physical machines for the purpose of reducing cooling costs, such action can also be performed for the purpose of reducing power consumption of physical machines (for more efficient usage).

Both the cooling criteria and power criteria are considered consolidation criteria that favor migrating virtual machines onto fewer physical machines so that at least some of the physical machines can be turned off or otherwise placed into an idle state, for cost and power conservation. However, the cooling and power criteria are counter-balanced by some of the other factors, such as loading criteria that tend to favor distributing or spreading virtual machines across a larger number of physical machines.

Another criterion that is considered by the VM layout selector 144 is the cost of performing migration of a virtual machine. Migrating a virtual machine from one physical machine to another physical machine is associated with a cost (in terms of the virtual machine being unavailable during migration and the bandwidth cost associated with moving data associated with the migrated virtual machine from one storage location to another storage location). If the VM layout selector 144 determines that the benefit of migrating a virtual machine is less than the cost of performing the migration, then the migration should not be performed.

As noted above, the placement problem for identifying an optimal solution for placement of virtual machines on physical machines is a relatively complex problem. For a large system having many physical machines and virtual machines, the computation time for identifying the optimal placement of virtual machines can be very large. In accordance with an embodiment, a simulated annealing technique is used to find an approximation of a globally optimal placement of virtual machines on physical machines. Generally, simulated annealing considers a current set (that represents some random placement of virtual machines on physical machines), and iteratively adjusts the current set until a better set can be identified. The simulated annealing algorithm attempts to replace a current solution with a random "nearby" solution. A new set that is more optimal than the current set is used as the new current set, and this process repeats until an approximated optimal solution is identified.

The simulated annealing algorithm performed by the VM layout selector 144 is based on a cost function (alternatively referred to as a "goodness function") that takes into account various constraints that represent the predefined criteria described above. The cost function is represented by some aggregation of terms, where each term is multiplied by a weight factor. Generally, the cost function has the form: $f=w_1 \times t_1 + w_2 \times t_2 + \ldots$, where the $t_i$ terms (i=1 to N) represent corresponding criteria (N total criteria, where N is an integer) to be considered, and the $w_i$ parameters represent weights to be applied to the terms. As examples, the $t_i$ terms can represent resource loading criteria (n terms to correspond to the n dimensions of resources), balancing criteria, cooling criteria, power criteria, and so forth. The weight to be multiplied to each term generally represents the importance of the corresponding term in computing the goodness rating for a particular layout of virtual machines.

The weights in some cases can be set (or otherwise influenced) by a user. For example, the controller 136 can present a graphical user interface (GUI) screen that provides various fields in which the user can input values corresponding to weights to be applied to various terms. In an alternative implementation, the weights can be input to the controller 136 by some other technique, such as in a file. Other weights can be hardcoded into the VM layout selector 144.

Each of the terms in the cost function is based on parameters measured or estimated by the VM layout selector 144. For a given layout of virtual machines, parameters corresponding to the various criteria being considered are measured or estimated. For example, parameters relating to resource utilization, cooling costs, power consumption, balancing, and so forth, for a given layout of virtual machines can be measured or estimated. Note that the parameters corresponding to the current layout (the layout that is currently being used) can be measured by the VM layout selector 144. However, when considering alternative layouts (which are trial layouts not yet implemented) to compare to the current layout, the parameters for the alternative layouts may have to be estimated (using an internal model provided with the VM layout selector 144), where the model can be generated based on historical information. The measured or estimated parameters are then translated to the terms of the cost function. Thus, for each given layout of virtual machines, the cost function outputs a goodness rating indicator.

Figure 4:
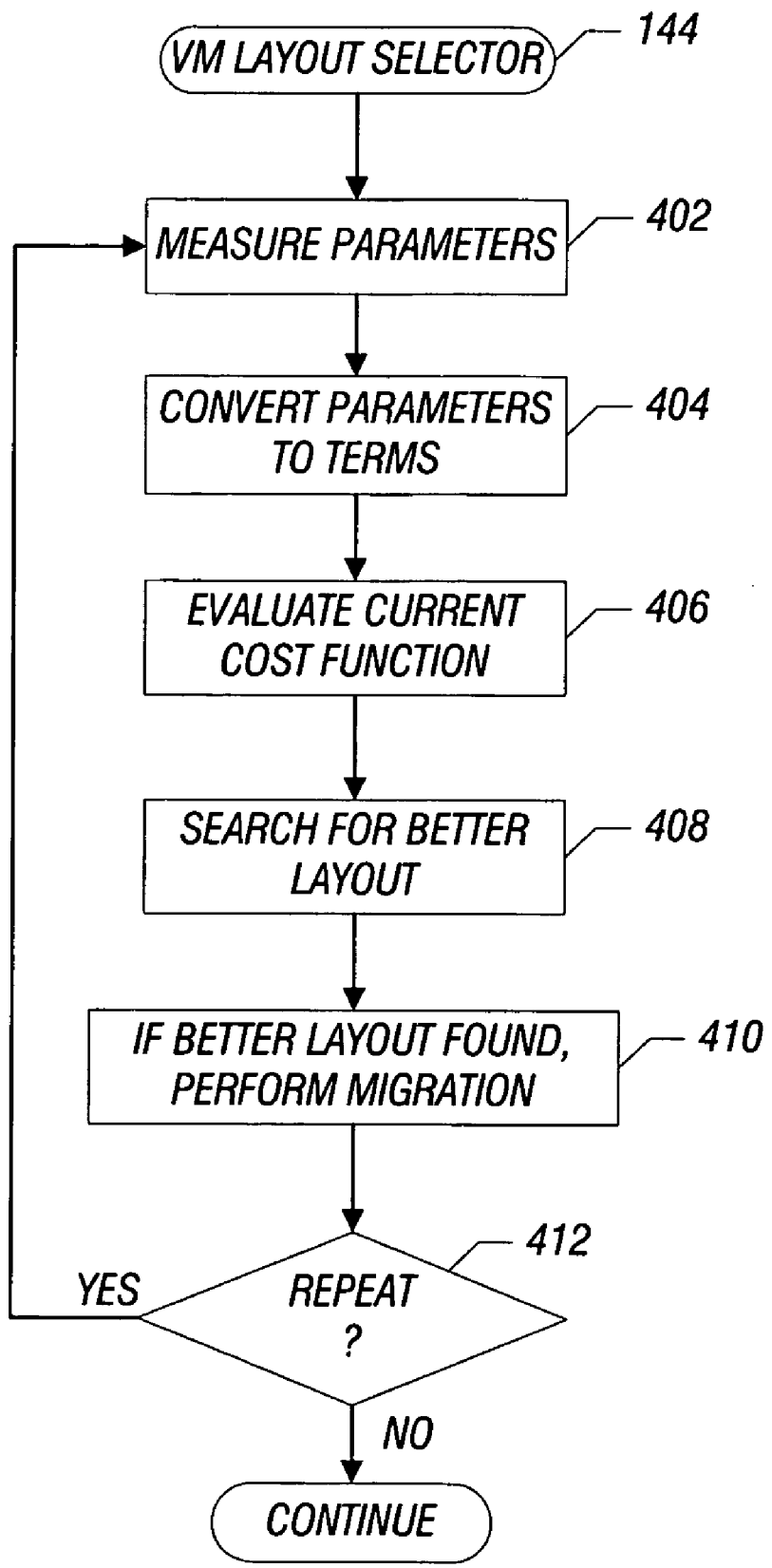
FIG. 4 is a flow diagram of a virtual machine layout selection process performed by a controller, in accordance with an embodiment.

A flow diagram of a process performed by the VM layout selector 144 is depicted in FIG. 4. The flow of FIG. 4 is performed repeatedly, such as at regular intervals or in response to predefined events (such as the event of placing a physical machine into a lower power mode). The VM layout selector 144 of the controller 136 measures (at 402) various parameters relating to the terms to be considered for the cost function discussed above. The measured parameters are converted (at 404) into the terms for use in the cost function.

The VM layout selector 144 then evaluates (at 406) the cost function based on the terms derived from the measured parameters. The cost function produces an output that provides some indication of the performance of the particular placement of virtual machines on physical machines (such as in the form of a goodness rating or some other indicator). Next, the VM layout selector 144 searches (at 408) for a better layout that represents another placement of virtual machines on physical machines.

If a better virtual machine layout is found in the search (at 408) for the better layout, the VM layout selector 144 causes the migration module 146 to perform (at 410) migration of one or more virtual machines according to the better virtual machine layout.

The VM layout selector 144 determines (at 412) if the process at 404-410 is to be repeated. Repetition of the process at 404-410 can be performed periodically or in response to predefined events (e.g., detection of overheating, alarm indicating some fault has occurred, indication of overloading, placing a physical machine into a lower power mode, etc.).

Figure 5:
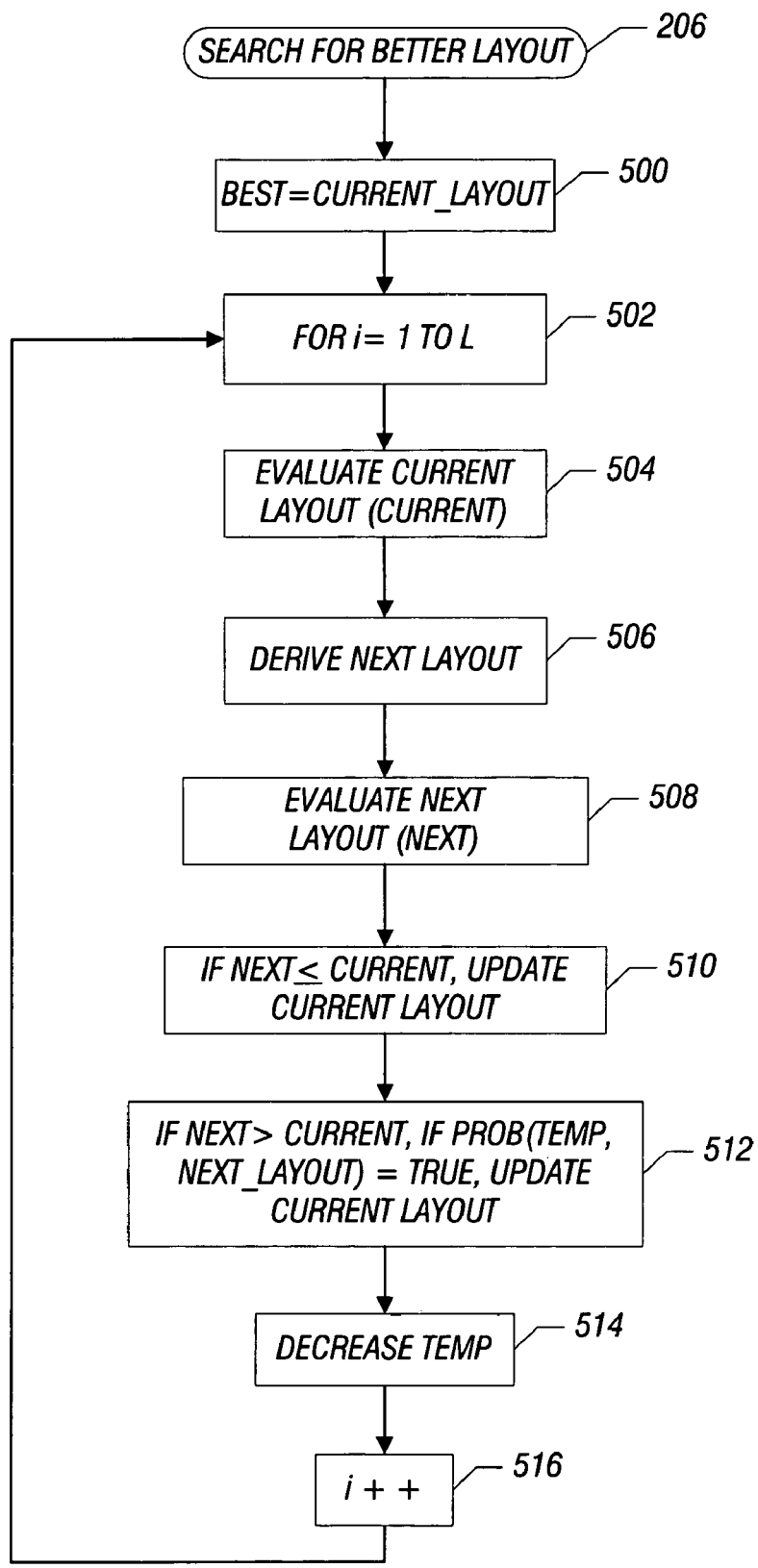
FIG. 5 is a flow diagram of a process to find a better layout of virtual machines, in accordance with an embodiment.

The process of searching for a better layout (408) according to one implementation is depicted in greater detail in FIG. 5. Note that different algorithms can be used in other implementations. Searching for a better layout is performed iteratively in a loop (For loop 502 where a variable i is incremented from 1 to L). Note that the value of L (which represents the number of iterations to be performed in searching for a better layout) is dependent upon various factors, including desired quality of the solution identified in the search and computation time constraints. The value of L may potentially be influenced by a user or by the controller 136. A larger number of iterations (larger L) would lead to a better solution; however, the larger number of iterations comes at the expense of longer computation time. Another factor to be considered in setting the value of L is the expected frequency with which the procedure of FIG. 4 is performed. The computation time involved in performing the process of FIG. 5 should not exceed the expected time interval between iterations of the FIG. 4 procedure; otherwise, the result produced by the FIG. 5 procedure in finding a better layout would not be produced in time for use in the procedure of FIG. 4.

In FIG. 5, before starting the loop 502, a variable Best is set (at 500) equal to the current layout (represented by Current_Layout). Next, after entering the loop 502, the current layout is evaluated (at 504) by setting a variable Current equal to Eval(Current_Layout). Eval( ) is a subroutine invoked by the VM layout selector 144 to evaluate the cost function, in this case the cost function containing terms relating to the current layout.

A next layout (represented by Next_Layout) is then derived (at 506) by setting Next_Layout equal to Tweak(Current_Layout), where Tweak( ) is a subroutine invocable by the VM layout selector 144 for modeling the change in the placement of virtual machines. In other words, the layout produced by Tweak( ) is a trial layout used for purposes of comparison to the current layout; no actual migration of virtual machines occurs yet. According to the simulated annealing technique, the next layout selected is based on generating random numbers, where the random numbers can indicate which virtual machine(s) and which physical machine(s) are to be the subject of a migration, which migration causes the next layout to be different from the current layout. In one embodiment, according to the simulated annealing technique, the tweak can be a minor tweak, in which just one or two virtual machines are moved to different physical machines. In yet another implementation, over L iterations, two moves of virtual machines can be made in iterations 1 to L/2, whereas just one move of a virtual machine is performed in iterations L/2+1 to L. In other implementations, other types of tweaks can be performed.

After the next layout has been derived, the VM layout selector 144 evaluates (at 508) the next layout (the tweaked layout) by calling Eval(Next_Layout). The result of the evaluation (the goodness rating) is stored in a variable Next. Assuming that a lower goodness rating specifies a better layout, if Next≦Current (in other words, the tweaked layout is better than the current layout according to the goodness rating), then the current layout is updated (at 310). In updating the current layout, Current_Layout is set equal to Next_Layout, and the variable Best is set equal to Next_Layout. Note that in other implementations, other types of goodness ratings can be used, where a higher goodness rating would indicate a better layout.

If the tweaked layout is determined to be worse than the current layout based on the goodness rating (Next>Current), then the current layout (Current_Layout) can still be updated (at 512) with the tweaked layout (Next_Layout) based on the output of a probability function, Prob(Temp, Next_Layout). Effectively, if the probability function evaluates to a true result, the current layout is set equal to the tweaked layout even though the tweaked layout has a worse goodness rating (Next) than the goodness rating (Current) of the current layout. This update of the current layout with a worse tweaked layout is performed to reduce the likelihood that the algorithm of searching for a better layout will be trapped in a local minimum.

The probability function Prob( ) compares a random number against a value that is based on goodness ratings Next and Current and a temperature value (Temp). In one embodiment, comparison performed by the Prob( ) function is expressed as follows:

$$Rg( ) < e^{(Current-Next)/Temp} \quad \text{(Eq. 1)}$$

where Rg( ) is a function to produce a random number between 0 and 1. Since Next is larger than Current when the step at 512 is performed, the exponential function e is of a negative value, since (Current−Next) is negative. Therefore, the exponential function e will produce a value less than 1.

The Temp value in Eq. 1 is a value that decreases as a function (linear or non-linear function) of the number of iterations in FIG. 5. As Temp decreases, the exponential function will likely be of a larger negative number with each iteration, such that the exponential function will likely produce a smaller value. A smaller value produced by the exponential function means that the comparison of Eq. 1 will more likely to produce a false result. Because Temp is in the denominator, in the case where Temp is equal to zero, the function Prob( ) handles this special case by outputting a false result.

As indicated by FIG. 5, if the probability function Prob( ) produces a true result, then the current layout is updated (at 512) by setting Current_Layout=Next_Layout, and by also setting Best equal to Next_Layout. However, if the probability function Prob( ) produces a false result, the current layout remains unchanged.

Next, the value of Temp is decreased (at 516). As noted above, decreasing Temp increases the likelihood that the comparison of Eq. 1 produces a false result. The effect of reducing Temp with each iteration of the procedure in FIG. 3 is that in the later rounds of the FIG. 5 procedure, the lower value of Temp will cause it more unlikely for the current layout to be set equal to a tweaked layout that has a worse goodness rating than the current layout.

The value of the variable i is then incremented (at 518), and the loop 502 is re-iterated until L iterations have been performed.

In a different embodiment, instead of using the simulated annealing algorithm discussed above, a genetic algorithm can be used for selecting a better layout regarding placement of virtual machines on physical machines. In the genetic algorithm approach, candidates corresponding to different virtual machine layouts are provided. These candidates are the potential solutions to the problem of finding the better virtual machine layout. The candidates are represented by genetic representations (in the form of genetic individuals that are made up of a set of genes). Thus, each genetic individual represents a possible virtual machine placement solution. Each of the candidates represented by the genetic individuals is evaluated by the genetic algorithm to determine some goodness rating (which can be computed using a function for producing a measure indicating performance) for the corresponding candidate.

Some subset of the genetic individuals can then be selected (such as the subset of parents with the best goodness ratings) as parents for performing cross-over operation. In a cross-over operation, one genetic individual is combined with another genetic individual (by a cross-over function) to produce a child genetic individual. Each child genetic individual represents a different potential solution of a virtual machine layout. The goodness ratings for the children genetic individuals are then determined, with these children genetic individuals selected for further cross-over operation. The genetic algorithm proceeds over several different generations until some better solution is identified. The number of generations to be traversed can be preset. A benefit of genetic algorithms is that they are less likely to be trapped in local minima.

In yet another embodiment, other types of Stochastic algorithms can be used to approximate an optimal solution to the virtual machine placement problem by using a random search of some portion of the solution space. The simulated annealing technique and genetic algorithm technique discussed above are examples of Stochastic algorithms.

Instructions of software described above (including migration engine, evacuate function, and VM layout selector of FIG. 1) are loaded for execution on a processor (such as one or more CPUs 124, 138 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving a first command responsive to activation of a power button to place a first physical machine into a lower power mode, wherein the first physical machine has a virtual machine; and
   in response to the first command, performing a procedure to migrate the virtual machine from the first physical machine to a second physical machine, wherein performing the procedure to migrate comprises:
     calling a function in a placement controller in response to receiving the first command to place the first physical machine into a lower power mode, where the activation of the power button is mapped to the function in the placement controller;
     receiving a message responsive to calling the function, wherein the message identifies the second physical machine as a destination physical machine;
     receiving a second command indicating another activation of the power button prior to migrating the virtual machine from the first physical machine to the second physical machine; and
     cancelling migration of the virtual machine from the first physical machine to the second physical machine in response to the second command.

2. The method of claim 1, wherein receiving the first command responsive to the activation of the power button comprises receiving the first command that is responsive to activation of a soft power button.

3. The method of claim 1, wherein receiving the first command responsive to activation of the power button comprises receiving the first command that is responsive to activation of a power control element in a graphical user interface.

4. The method of claim 1, further comprising:
   after migration of the virtual machine, placing the first physical machine into the lower power mode; and
   after migration of the virtual machine, the placement controller determining whether placement of virtual machines on plural physical machines can be improved, wherein the plural physical machines comprise the second physical machine and at least another physical machine; and
   in response to the placement controller determining that placement of the virtual machines on the plural physical machines can be improved, performing further migration of one or more virtual machines.

5. The method of claim 1, wherein performing the procedure to migrate further comprises:
   activating a visual indicator to indicate that the first physical machine is being placed into lower power mode.

6. An article comprising at least one non-transitory computer-readable storage medium containing instructions that when executed cause a first physical machine to:
   receive a first command responsive to user activation of a power control element to place the first physical machine into a lower power mode;
   in response to the first command, call a function in a placement controller, where the user activation of the power control element is mapped to the function in the placement controller;
   receive a message responsive to calling the function, where the message identifies a destination physical machine to which a virtual machine of the first physical machine can be migrated;
   receive a second command indicating another activation of the power control element prior to migrating the virtual machine from the first physical machine to the destination physical machine; and
   cancel migration of the virtual machine from the first physical machine to the destination physical machine in response to the second command.

7. The article of claim 6, wherein receiving the first command is in response to user activation of a power button.

8. A system comprising:
   plural physical machines having virtual machines, wherein at least a first one of the plural physical machines has a power control element,
   the first physical machine having a module responsive to activation of the power control element to cause migration of at least one virtual machine in the first physical machine to at least one other destination physical machine; and
   a placement controller separate from the module to communicate with the module, the placement controller having an evacuate function mapped to activation of the power control element,
   wherein the module is responsive to activation of the power control element by calling the evacuate function to enable identification of the at least one other destination physical machine to which the at least one virtual machine is to be migrated, and
   wherein the module is to further:
     receive a second command indicating another activation of the power control element prior to migrating the virtual machine from the first physical machine to the at least one other destination physical machine; and
     cancel migration of the virtual machine from the first physical machine to the at least one other destination physical machine in response to the second command.

9. The system of claim 8, wherein the power control element comprises a power button, and the module comprises an administrative virtual machine in the first physical machine.

10. The system of claim 8, wherein the placement controller further comprises a layout selector to select an optimal placement of virtual machines on the plural physical machines, and wherein the layout selector is to interact with the evacuate function.

11. The article of claim 6, wherein receiving the first command is in response to user activation of the power control element in a graphical user interface.

12. The system of claim 8, wherein the power control element is in a graphical user interface.

* * * * *